Dec. 22, 1931.  C. HERWIG, JR  1,837,549

HERMETICALLY SEALED AIR MIXER

Filed June 30, 1930

INVENTOR
Conrad Herwig, Jr.
BY
Toulmin & Toulmin
ATTORNEY

Patented Dec. 22, 1931

1,837,549

UNITED STATES PATENT OFFICE

CONRAD HERWIG, JR., OF PIQUA, OHIO, ASSIGNOR TO THE FAVORITE STOVE AND RANGE COMPANY, OF PIQUA, OHIO, A CORPORATION OF OHIO

HERMETICALLY SEALED AIR MIXER

Application filed June 30, 1930. Serial No. 464,759.

This invention relates to improvements in devices for regulating the admission of air to gas burners used in connection with cooking ranges and other cooking and heating stoves in which burners are used.

It is particularly the object of this invention to provide means for regulating the amount of air admitted to the mixing chamber so that as the amount of gas is regulated the amount of air may be likewise regulated.

It is also an object of this invention to provide, in connection with means for regulating the admission of air, means to form a hermetically sealed connection between the gas inlet stem and the means for regulating the flow of gas and air. While in the present instance this hermetical sealing means consists of an asbestos gasket, other suitable and effective material may be used instead of asbestos.

These and other advantages will appear from the description taken in connection with the drawings.

Referring to the drawings.

The numeral 1 is used to indicate a vertical stem used for the admission of air and gas to stoves, ovens and other apparatus in which gas may be burned. The outer end of this stem is bell-shaped, as indicated by the numeral 2, and has on the outer end thereof an annular periphery 3. Around this annular periphery is an annular gasket 4. This gasket may be made of any suitable material but preferably of asbestos.

Figure 1:
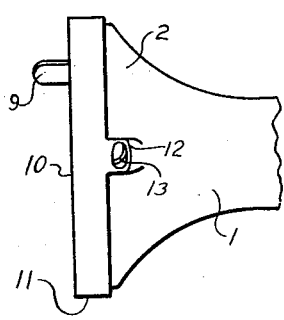
Figure 1 is a side elevation of the outer end of a burner stem showing the regulating means attached thereto.
Figure 2:
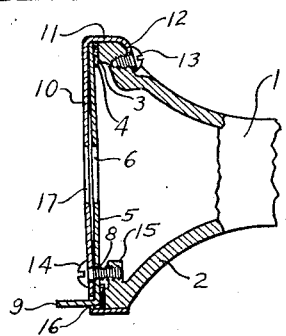
Figure 2 is a section on the line 2—2 of Figure 3.
Figure 3:
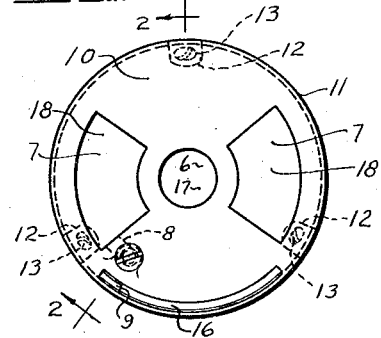
Figure 3 is an end elevation of the air regulator attached to the stem, and showing the air openings open.
Figure 6:
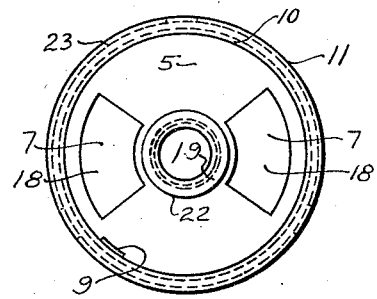
Figure 6 is an end elevation of the regulating means showing the gas inlet bushing.
Figure 9:
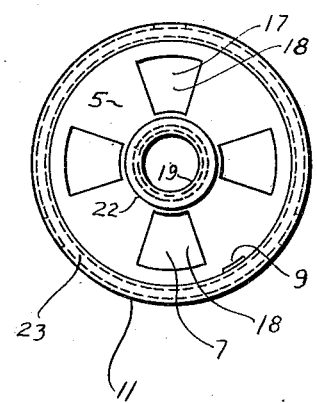
Figure 9 is a view similar to Figure 6, but showing a larger number of air inlet openings. In this form there are shown four of these openings.
Figure 10:
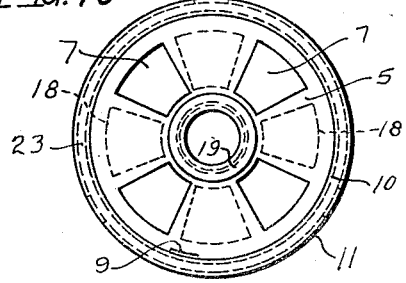
Figure 10 is a view similar to Figure 9, but showing the air control means in a position to shut off the air.

Fitting over this annular gasket, as shown in Figure 2, is a disc 5 which has therein a central opening 6 for the admission of gas into the stem. Around the central opening is arranged a plurality of air inlet passages 7. As shown in Figures 3 and 6, there are two of these air passageways. The number may be varied. In Figures 9 and 10 four are shown. Adjacent the periphery of the disc 5 and opening into one of the air passageways is a slot 8 to accommodate a screw. Extending upwardly from the outer periphery of the disc 5 is a tongue 9.

Figure 7:
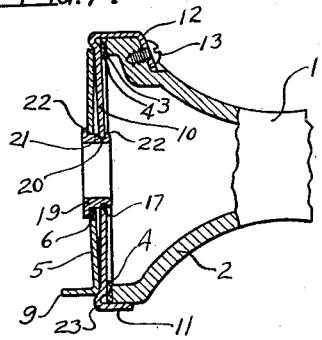
Figure 7 is a section similar to Figure 2 but with the bushing added thereto.

Fitting over the disc 5 positioned upon the annular gasket 4 is a cap-shaped member, being formed of a disc 10 and a peripheral marginal flange 11. On this marginal flange is a plurality of prongs 12 adapted to be bent in and attached to the outer periphery of the end of the stem by means of screws 13. This form of attachment for the cap is shown in Figures 2 and 7. Extending through the disc 10 and into a lug 15 on the inner edge of the annular periphery is a screw 14. This screw serves to hold the discs in place upon the outer end of the stem and in this manner assists the screws 13. This screw is not sufficiently forced in to prevent the turning of the disc 5 so that the air passageways may be closed.

Figure 4:
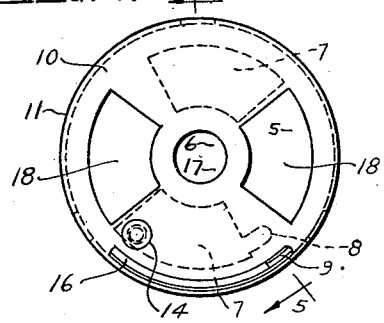
Figure 4 is a view similar to Figure 3 with the air openings closed.
Figure 5:
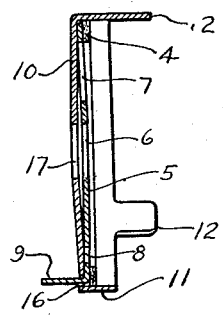
Figure 5 is a section on the line 5—5 of Figure 4.

For the purpose of accommodating the tongue 9 the outer periphery of the disc 10 has a slot 16 therein. This disc 10 also has a central opening 17 in line with the central opening 6 of the disc 5. This opening may be of the same size as the opening 6 or it may be larger. In the forms shown in Figures 7 and 8 the opening 17 is smaller than the opening 6. The disk 10 has also between the central opening and the outer periphery thereof air passageways 18 adapted to register with the air passageways 7 in the disc 5. In Figure 3 these passageways are shown in register with each other, whereas in Figure 4 they are shown out of register and with the passageway in each disc closed by the other disc so that no air can pass into the stem.

Figure 8:
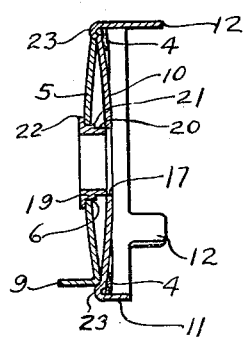
Figure 8 is a section through the air regulating means showing two concave discs with the space between the discs exaggerated, and the bushing that holds the discs together in position for being clamped to one of the discs after the discs have been pressed together to some extent.

It is also observed that the discs are concave in shape with their concave faces abutting each other so that the central parts of the discs are slightly removed. It is therefore apparent that in rotating the inner disc, as shown in Figure 2, only the edges of the discs contact, the other parts of the discs being out of contact and free from wear. In order to hold the central parts of these two discs in adjusted spaced relation to each other there may be provided a bushing 19. Each end of this bushing is turned over to engage the outside surface of the adjacent disc. One end of the bushing is reduced at 20 to engage the smaller opening in the disc, while the other part of the bushing is larger to engage the larger opening in the disc 10. This reduced part of the bushing provides a shoulder 21. The space between the shoulder 21 and the turned end engaging the disc 10 is slightly longer than the thickness of the disc 10 so that there is maintained between the discs a slight space, as shown in Figure 7. When the discs are positioned as shown in Figure 7 they are held in that position. Figure 8 shows the discs before the bushing is applied. However, the space between the discs is exaggerated in order to bring out more clearly the concave shape of the two discs.

In the forms shown in Figures 7 and 8 the rotating disc is on the outside of the disc that forms part of the cap. In this form the bushing is necessary to hold the two discs together. The same bushing, however, may be used in connection with the arrangement shown in Figure 2. The turned-over ends of the bushing are indicated by the numeral 22. In the form shown in Figure 7 the outer periphery of the cap has a bead 23. In this form the disc is pressed inward rather than outward, as shown in Figure 2. This arrangement is merely for the purpose of adjusting the different relations of the two discs. In one the movable disc is on the inside of the cap, whereas in the other the movable disc is on the outside of the cap.

The purpose of the asbestos gasket is to provide a tight sealing fit between the outer end of the burner stem and the cap. While this gasket is here described as being made of asbestos, any other suitable material may be used provided that it forms an air-tight fit and is not subject to be destroyed by combustion.

I desire to comprehend within my invention such modifications as may be clearly embraced within my claims and the scope of my invention.

Having thus fully described my invention, what I claim is new and desire to secure by Letters Patent, is:

1. In an air regulator, in combination with a burner stem having an opening, a closure for said opening consisting of concaved discs arranged with their concaved faces opposite each other, and a heat resisting gasket between one of the discs and the stem.

2. In an air regulator, in combination with a burner stem having an opening, a closure for said opening consisting of concaved discs arranged with their concaved faces opposite each other, and an asbestos gasket between said discs and the stem.

3. In an air regulator, a cap member consisting of a concaved disc and a peripheral flange, a rotatable disc fitting within the cap member and contacting with only the outer edges of the concave face of the concave disc, each disc having an air opening adapted in one position to register with the opening in the other and in another position to be closed by the other disc, and an asbestos gasket in the cap member and engaging the outer edges of the rotatable disc.

4. In an air regulator, a cap member consisting of a disc having a peripheral flange and a slot adjacent said flange, a rotatable concave disc fitting within said cap and having a tongue projecting through said slot for rotating the rotatable disc, each disc having a central gas hole and an air opening, and an asbestos gasket within the cap member and engaging the outer edges of the rotatable disc.

5. In an air regulator, in combination with a hollow stem, a cap adapted to fit over the end of said stem, said cap consisting of a disc having a peripheral flange engaging the end of the stem, a rotatable concave disc between the cap and said end having its concave face adjacent the cap, each of said discs having a central opening and a plurality of other openings, a gasket between the rotatable disc and the end of the stem, and means to rotate the rotatable disc to vary the relative positions of the plurality of openings.

6. In an air regulator, in combination with a burner stem having an opening, a cap member engaging said stem and forming part of a closure for said opening, a concave disc cooperating with said cap member and forming another part of the closure for said opening, and an asbestos gasket between the cap member and the stem.

7. In an air regulator, in combination with a burner stem having an opening, a cap member engaging said stem over the opening, said cap member consisting of a concaved disc and a peripheral flange, a concave disc having its concave surface in engagement with the concave surface of the first named disc, each of said discs having a plurality of air openings therein adapted to be closed by the other disc, means to rotate the second disc, and an asbestos gasket between the discs and the burner stem.

In testimony whereof, I affix my signature.

CONRAD HERWIG, Jr.